United States Patent
Muller et al.

(10) Patent No.: US 6,770,702 B1
(45) Date of Patent: Aug. 3, 2004

(54) POLYMER

(75) Inventors: Horst Muller, Cologne (DE); Hans-Dieter Hille, Bergisch Gladbach (DE)

(73) Assignee: PPG Industries Lacke GmbH, Wuppertal (DE)

( * ) Notice: Subject to any disclaimer, the term of this patent is extended or adjusted under 35 U.S.C. 154(b) by 151 days.

(21) Appl. No.: 10/030,526

(22) PCT Filed: Apr. 20, 2000

(86) PCT No.: PCT/DE00/01259

§ 371 (c)(1),
(2), (4) Date: Apr. 16, 2002

(87) PCT Pub. No.: WO00/63265

PCT Pub. Date: Oct. 26, 2000

(30) Foreign Application Priority Data

Apr. 21, 1999 (DE) .......................... 199 18 137
Apr. 21, 1999 (DE) .......................... 199 18 136
Apr. 21, 1999 (DE) .......................... 199 18 133

(51) Int. Cl.[7] .............................. C08J 3/00; C08K 3/20; C08L 75/00; C08L 51/00; C08L 67/00

(52) U.S. Cl. ...................... 524/539; 524/507; 524/589; 524/590; 524/591; 524/839; 524/840; 525/123; 525/128; 525/440; 525/455; 525/902

(58) Field of Search .............................. 524/591, 589, 524/590, 539, 507, 839, 840; 525/123, 128, 440, 455, 902

(56) References Cited

U.S. PATENT DOCUMENTS

| | | | |
|---|---|---|---|
| 4,777,207 A | 10/1988 | Redman | 524/458 |
| 4,927,875 A | 5/1990 | Maska et al. | 524/457 |
| 5,280,075 A * | 1/1994 | Oshima et al. | 525/301 |
| 5,786,420 A | 7/1998 | Grandhee | 525/7 |
| 5,856,408 A | 1/1999 | Matsukura et al. | 525/301 |
| 6,538,059 B1 * | 3/2003 | Muller et al. | 524/591 |

FOREIGN PATENT DOCUMENTS

| | | | |
|---|---|---|---|
| DE | 40 09 858 A1 | 10/1991 | C09D/151/06 |
| DE | 195 04 015 A1 | 8/1996 | C08F/283/02 |
| EP | 0 808 333 B1 | 9/1998 | C08F/2/24 |
| EP | 0 947 557 A2 | 10/1999 | C08L/31/02 |
| JP | 63061011 A | 3/1988 | C08F/220/18 |

* cited by examiner

Primary Examiner—Patrick D. Niland
(74) Attorney, Agent, or Firm—Fish & Richardson P.C.

(57) ABSTRACT

Polymer obtainable by a multistage polymerization process which involves conducting, in a first step, an aqueous-phase polymerization of at least one ethylenically monofunctional compound alone or together with at least one ethylenically difunctional or poly-functional compound together in the presence of a polyesterpolyol, polyurethane and/or polyacrylate; and, in a subsequent step, a reaction of the resulting product with at least one ethylenically monofunctional compound alone or together with at least one ethylenically difunctional or polyfunctional compound; followed by a reaction of the resulting product with a crosslinker; and its use.

38 Claims, No Drawings

POLYMER

The present invention relates to polymers and to their use, particularly in the field of automotive OEM finishing.

A conventional auto finish by the "basecoat/clearcoat" process, affording sufficient stone-chip resistance and effective UV protection, is generally composed of a total of four different coats (four-coat system). These four coats are applied successively in separate coating units.

The first coat, located directly on the sheet metal of the auto, is an electrophoretically applied coat (electrocoat) which to protect against corrosion is applied by electrodeposition coating—primarily cathodic deposition—and then baked.

The second coat, located atop the electrocoat and with a thickness of from about 30 to 40 $\mu$m, is a so-called primer-surfacer coat, affording on the one hand protection against mechanical attack (stone-chip protection function) while on the other hand smoothing the rough surface of the raw body for the subsequent topcoat, filling minor unevennesses, and protecting the electrophoretically deposited coat (electrocoat) against natural UV radiation. This coat is largely produced by applying a baking varnish, using electro-static high-speed rotating bells, followed by a baking operation at temperatures above 130° C.

The third coat, located atop the primer-surfacer coat, is the basecoat, which by means of appropriate pigments gives the body the desired color. The basecoat material is applied by the conventional spraying process. The thickness of this conventional basecoat, depending on shade, is between about 12 to 25 $\mu$m. In the case of metallic effect coating materials in particular, this coat is normally applied in two process steps. In a first step, application takes place by means of electrostatic high-speed rotating bells, followed by a second application using pneumatic atomization. This coat (when using aqueous basecoat material) is subjected to interim drying using infrared lamps and/or by means of hot-air convection.

The fourth and topmost coat, located on the basecoat, is the clearcoat, generally applied in one application by means of electrostatic high-speed rotating bells. It gives the body the desired gloss and protects the basecoat against environmental effects (UV radiation, salt water, etc).

The basecoat and the clearcoat are then baked together.

With a view to protecting the environment, more and more water-based automotive OEM paints are being used. Aqueous automotive OEM paints are very well established and it is now hard to conceive of industrial application without them, not only for reasons of protecting the environment. Aqueous paint systems are now no longer just a necessary evil, but instead constitute a serous alternative from the standpoints of technology and of the potential possibilities. Nevertheless, in recent years the requirements have risen considerably. The need to increase productivity while at the same time achieving further reductions in emission levels is imposing new requirements on aqueous basecoat systems. Those to be mentioned in particular include compatibility with low-emission clearcoats (powder, aqueous clearcoat, powder slurry) and the need, owing to shorter processing cycles, to increase application reliability. For example, it is very difficult to achieve the required adhesion properties using a prior art aqueous basecoat together with a powder clearcoat.

Compatibility with clearcoat materials based on powder slurry, in particular, is imposing particularly stringent requirements on aqueous basecoat materials.

The term powder slurry refers to a suspension of paint particles and water, normally consisting of from 60 to 70% by weight water and from 30 to 40% by weight solids. Such compositions are known, for example, from DE 196 13 547 C2 and DE 196 18 657 A1. The use of a powder slurry of this kind is notable for particularly simple application of the corresponding coating materials. Thus a coating material of this kind can be applied using a conventional coating unit for wet coating materials; in other words, there is no need to use specially separated coating equipment such as is needed for coating with powder materials. An unwanted effect observed when using conventional, water-based basecoat materials under a powder slurry clearcoat is that known as "mud-cracking". This term describes a surface condition of the cured paint surface which is attributable to cracking of the coats of paint and is comparable with the appearance of dried-out desert soil.

In the case of an aqueous metallic basecoat material, moreover, the "gassing stability" is particularly important. The expression "gassing stability" refers to the property of a metallic effect paint containing unprotected aluminum particles which do not react with the water solvent to form hydrogen. One way of influencing this property is to use specific, specially treated aluminum bronzes (EP-0 321 470). Aluminum bronzes of this kind are relatively expensive, not very bright, and may introduce unwanted properties into the system, such as an increased tendency toward agglomeration, for example.

Another way of preventing gassing is to add appropriate additives (EP-0 206 615 B1 and EP-0 238 222 B1). In many cases, the additives in question, in addition to their desired activities, may also introduce negative properties into the system.

Owing to the heightened profile of requirements imposed on an aqueous basecoat material that can be used in the automobile industry, the Theological properties of such a material are accorded an increased significance. What is understood by the term "rheological properties" is that the paint on the one hand has such a low viscosity during the spraying operation, i.e., at high shear rates, that it may easily be atomized, and on the other hand, when it impinges on the substrate, i.e., at low shear rates, has such a high viscosity that it is sufficiently firm and does not exhibit any running. The development of a pronounced metallic effect is also associated with these properties.

For improving the rheological properties and for improved development of the metallic effect, particular additives are described (EP-0 281 936). The additives in question are special phyllosilicates, which contain considerable amounts of alkali metal or alkaline earth metal ions. Because of their water-attracting effect, these ions often lead to poor condensation resistance in the overall system of an automobile coating.

Consequently, efforts are made by the paint manufacturers to avoid such additives where possible and to use as binders those polymers which provide the desired properties themselves: so-called "custom-tailored" polymers.

One of the most important representatives of these species are aqueous dispersions of crosslinked polymer microparticles.

For instance, EP-0 502 934 describes a microgel dispersion. This dispersion is used both to improve the Theological properties and to increase the gassing stability of aqueous metallic basecoat materials. These microgel dispersions are prepared by a single-stage polycondensation of a polyester-polyol with an amino resin (melamine resin) in aqueous phase. The use of this microgel in basecoat materials for the coating of automobile bodies has the disadvantage, however, that the adhesion between the basecoat and a clearcoat applied atop it from a powder clearcoat material or a powder clearcoat slurry does not meet the requirements laid down by the automobile industry.

Furthermore, DE 195 04 015 A1 discloses microgels which are prepared by polymerizing an ethylenically monofunctional compound (polyacrylate) with at least one ethylenically difunctional or polyfunctional compound in the presence of a polyester. The polyester in this case acts as an emulsifier and stabilizer. These microgels have the disadvantage that the rheological properties of these paints no longer meet the heightened requirements of the automobile industry. This is evident with particular clarity with regard to the requirements in terms of viscosity, on the one hand, and in terms of firmness, on the other. For instance, it is not possible using these microgels to provide an aqueous basecoat material which has a viscosity of not more than 120 mPa·s at a shear rate of 1 000 s$^{-1}$ and at the same time is sufficiently firm that the necessary film thicknesses of 20–30 μm (depending on the particular shade) are achieved without running.

It is an object of the present invention to provide a polymer which, when used in color-imparting or colorless coating formulations, especially in basecoat materials and clearcoat materials for the automobile industry, gives said formulations not only the required Theological properties and the decorative properties but also the necessary adhesion below a coating material based on powder or powder slurry.

This object is achieved by means of a polymer obtainable by a multistage polymerization process which involves conducting a) in a first step, an aqueous-phase polymerization of a monomer mixture comprising
   i) from 7.5 to 93% by weight of at least one ethylenically monofunctional compound;
   ii) from 0.3 to 47.5% by weight of at least one ethylenically difunctional or polyfunctional compound;
   in the presence of a polymer selected from a
      polyesterpolyol having a number-average molecular weight of from 500 to 10 000, an acid number of between 22 and 224, and an OH number of between 60 to 400;
      polyurethane having a number-average molecular weight of from 500 to 20 000, an acid number of between 25 and 150, and an OH number of between 50 to 350, said polyurethane containing on average per molecule at least one free carboxyl group originating from a polyesterpolyol; and/or
      polyacrylate having a number-average molecular weight of from 2 000 to 100 000, an acid number of between 25 and 300, and an OH number of between 50 to 250;
b) in a subsequent step, a reaction of the product obtained from step a) with
   iii) from 5 to 85% by weight of at least one ethylenically monofunctional compound;
   the sum of the fractions of components (i) to (iii) being 100% by weight; followed by a reaction of the product obtained from step b) with a crosslinker.

This object is also achieved by a polymer obtainable by a multistage polymerization process which involves conducting a) in a first step, an aqueous-phase polymerization of a monomer mixture comprising
   i) from 15 to 95% by weight of at least one ethylenically monofunctional compound;
   in the presence of a polymer selected from a
      polyesterpolyol having a number-average molecular weight of from 500 to 10 000, an acid number of between 22 and 224, and an OH number of between 60 to 400;
      polyurethane having a number-average molecular weight of from 500 to 20 000, an acid number of between 25 and 150, and an OH number of between 50 to 350, said polyurethane containing on average per molecule at least one free carboxyl group originating from a polyesterpolyol; and/or
      polyacrylate having a number-average molecular weight of from 2 000 to 100 000, an acid number of between 25 and 300, and an OH number of between 50 to 250;
b) in a subsequent step, a reaction of the product obtained from step a) with
   ii) from 2.5 to 83% by weight of at least one ethylenically monofunctional compound;
   iii) from 0.1 to 42.5% by weight of at least one ethylenically difunctional or polyfunctional compound;
   the sum of the fractions of components (i) to (iii) being 100% by weight;
followed by a reaction of the product obtained from step b) with a crosslinker.

The object is equally achieved by a polymer obtainable by a multistage polymerization process which involves conducting a) in a first step, an aqueous-phase polymerization of a monomer mixture comprising
   i) from 7.5 to 93% by weight of at least one ethylenically monofunctional compound;
   ii) from 0.3 to 47.5% by weight of at least one ethylenically difunctional or polyfunctional compound;
   in the presence of a polymer selected from a
      polyesterpolyol having a number-average molecular weight of from 500 to 10 000, an acid number of between 22 and 224, and an OH number of between 60 to 400;
      polyurethane having a number-average molecular weight of from 500 to 20 000, an acid number of between 25 and 150, and an OH number of between 50 to 350, said polyurethane containing on average per molecule at least one free carboxyl group originating from a polyesterpolyol; and/or
      polyacrylate having a number-average molecular weight of from 2 000 to 100 000, an acid number of between 25 and 300, and an OH number of between 50 to 250;
b) in a subsequent step, a reaction of the product obtained from step a) with
   iii) from 2.5 to 83% by weight of at least one ethylenically monofunctional compound;
   iv) from 0.1 to 42.5% by weight of at least one ethylenically difunctional or polyfunctional compound;
   the sum of the fractions of components (i) to (iv) being 100% by weight;
followed by a reaction of the product obtained from step b) with a crosslinker.

A further inventive achievement of the object is provided by a polymer obtainable by a multistage polymerizaton process which involves conducting a) in a first step, an aqueous-phase polymerization of a monomer mixture comprising
   i) from 15 to 95% by weight of at least one ethylenically monofunctional compound;
   in the presence of a polymer selected from a
      polyesterpolyol having a number-average molecular weight of from 500 to 10 000, an acid number of between 22 and 224, and an OH number of between 60 to 400;

polyurethane having a number-average molecular weight of from 500 to 20 000, an acid number of between 25 and 150, and an OH number of between 50 to 350, said polyurethane containing on average per molecule at least one free carboxyl group originating from a polyesterpolyol; and/or polyacrylate having a number-average molecular weight of from 2 000 to 100 000, an acid number of between 25 and 300, and an OH number of between 50 to 250;

b) in a subsequent step, a reaction of the product obtained from step a) with ii) from 5 to 85% by weight of at least one ethylenically monofunctional compound;

the sum of the fractions of components (i) to (ii) being 100% by weight;

followed by a reaction of the product obtained from step b) with a crosslinker.

The ratio between the sum of the ethylenically monofunctional difunctional and/or polyfunctional compounds used in steps a) and b) and the sum of the crosslinker and polymer selected from a polyester-polyol, polyurethane and/or polyacrylate may amount to between 85:15 and 50:50.

Compared with the microgels of the prior art, these polymers have the advantage that they give a metallic basecoat material outstanding gassing stability and excellent Theological properties, it being possible for the first time with this metallic basecoat material to achieve sufficient adhesion and condensation resistance in conventional multicoat paint systems of automobiles, under a clearcoat formed from a powder clearcoat material or from a powder slurry clearcoat material, without the effect known as mud-cracking occurring when a powder clearcoat slurry is used.

The rheological properties of the coating compositions prepared using these polymers are much better than those of the prior art. For instance, with a coating material that contains the polymer of the invention in an amount, for example, of 20% by weight (based on the solids fraction), a viscosity of not more than 100 mPa·s at a shear rate of 1 000 $^{-1}$ can be obtained, the dry film thickness of the cured basecoat being at least 20 μm, without runs being observed.

A feature common to the polymers obtainable by four different modes of preparation is that they originate from a three-stage preparation process. The first preparation step a) comprises a polymerization of at least one monomer in the presence of a polymer. Because of its specific properties, in particular because of its sufficiently high acid number, this polymer is present in dispersed particle form in the polymerization solution. The monomer added during step a) migrates to the interior of the polymer particles and is then polymerized by suitable techniques known to the skilled worker. This produces a polymer having a core of the polymerized monomer surrounded by the polymer that was present during the polymerization (selected from the polyesterpolyol, polyurethane and/or polyacrylate). This structure corresponds substantially to a core/shell structure.

Depending on the process conditions chosen, the core is crosslinked or uncrosslinked: If in step a) at least one ethylenically monofunctional monomer is polymerized, the polymer which results after process step a) has an uncrosslinked core. Where, however, at least one ethylenically monofunctional monomer is polymerized in step a) with at least one ethylenically difunctional or polyfunctional monomer, a polymer having a crosslinked core is formed.

In this step a) it is important that the polymer selected from a polyesterpolyol, polyurethane and/or polyacrylate is present in such a sufficient amount that the added monomer is dispersed with adequate stability in the reaction mixture. Otherwise, the polymerization would not proceed with completeness and would ultimately lead to the coagulation of the entire dispersion.

The effect of the second preparation step b), is that the polymer particle originating from step a) receives a further polymer layer. Here again, the monomer added in step b) migrates into the polymer originating from step a), selected from a polyesterpolyol, polyurethane and/or polyacrylate (and forming the outer shell of the polymer particle from step a)), and is subsequently polymerized. In this way, a polymer particle is obtained which has a core comprising the polymerized monomer(s) from step a), located on the core a first shell of the polymerized monomer(s) from step b), and located on said first shell a second layer of the polymer selected from a polyesterpolyol, polyurethane and/or polyacrylate. As set out above under step a), the polymer layer surrounding the core, comprising the monomers from step b), is crosslinked or uncrosslinked as a function of an ethylenically difunctional or poly-functional monomer.

Both for preparation step a) and b), it is important that, when a monomer mixture is used comprising at least one ethylenically monofunctional monomer and at least one ethylenically difunctional or polyfunctional monomer in one of these preparation steps, the resulting polymer is fully crosslinked (the full crosslinking relates, however, only to the polymer which is directly obtainable from the monomer mixture, and not, for example, to the polymer selected from a polyesterpolyol, polyurethane and/or polyacrylate).

The degree of crosslinking of the polymer particles is evident from the amount of the insoluble fractions. The insoluble fractions are determined by means of the so-called "THF method". For this method, about 1 g of the microgel dispersion is weighed out into a centrifuge tube, 10 ml of tetrahydrofuran are added, and the mixture is homogenized in an ultrasound bath for about 1 minute. It is then centrifuged at 13 500 rpm for 15 minutes by means of a centrifuge with a fixed-angle rotor. The supernatant is then carefully decanted off and the tube is dried in a laboratory oven at 105° C. for 6 h. After the tube has cooled, the residue is weighed. The insoluble fractions are calculated in accordance with the following formula:

% insoluble fractions=residue*10 000/initial mass* % solids content of the microgel dispersion The term "fully crosslinked" is understood to refer to those polymers which have an uncrosslinked fraction—based on the polymer originating from the monomers used—of not more than 5% by weight.

In the third preparation step, the polymer particle originating from step b) is reacted with a crosslinker. Not until this step is the polymer selected from a polyesterpolyol, polyurethane and/or polyacrylate crosslinked, the functional groups of the crosslinker reacting with the OH groups of said polymer. The amount of crosslinker in this preparation step is to be chosen such that this final polymer layer is fully crosslinked in accordance with the criteria specified above. In general, the ratio of polymer selected from a polyesterpolyol, polyurethane and/or polyacrylate to crosslinker is between 90:10 and 40:60.

The end product obtained is a polymer particle whose exterior is fully crosslinked. Because of this property, it is unable to participate in the formation of a coating film and is largely inert toward other reactive polymers or else crosslinkers.

The ethylenically monofunctional compound used in the preparation of the polymer of the invention may be the same or different in steps a) and b).

In addition, the ethylenically difunctional or polyfunctional compound used in the preparation of the polymer of the invention may be identical or different in steps a) and b). The higher the desired degree of hardness or the crosslinking density of the polymer of the invention is to be, the higher the proportion of ethylenically difunctional or polyfunctional compounds in steps a) and b).

Particularly good results may be obtained if the polyesterpolyol, polyurethane and/or polyacrylate present during the polymerization contains on average per molecule at least one free carboxyl group which originates from trimellitic acid or trimellitic anhydride. This permits a particularly high reaction rate during the crosslinking.

One possible explanation for this circumstance could be the comparatively strong acidity of the carboxyl group of trimellitic acid.

Particularly suitable examples of the ethylenically monofunctional compound are alkyl esters or hydroxyalkyl esters of acrylic or methacrylic acid. Also suitable are vinyl acetate, vinyl toluene, styrene and/or acrylamide.

Preferred alkyl (meth)acrylates or hydroxyalkyl (meth)acrylates are those having from 1 to 18 carbon atoms in the alkyl radical, said alkyl radical being substituted or unsubstituted.

As alkyl (meth)acrylate, particular mention may be made of lauryl acrylate, isobornyl (meth)acrylate, cyclohexyl (meth)acrylate, tert-butylcyclohexyl (meth)acrylate, benzyl (meth)acrylate, glycidyl (meth)acrylate and trimethylcyclohexyl (meth)acrylate. Particular preference is given to α-ethylhexyl (meth)acrylate, methyl (meth)acrylate, n-butyl (meth)acrylate and tert -butyl (meth)acrylate. As hydroxyalky (meth)acrylate, mention may be made preferentially of 2-hydroxyethyl (meth)acrylate, 2-hydroxypropyl (meth)acrylate, 2-hydroxybutyl (meth)acrylate, hexane-1,6-diol mono(meth)acrylate, and 4-hydroxybutyl (meth)acrylate.

As the ethylenically difunctional or polyfunctional compound it is preferred to use diacrylates, triacrylates and/or (meth)acrylates of polyfunctional alcohols.

In particular, allyl (meth)acrylate, hexanediol di(meth)acrylate, ethylene glycol di(meth)acrylate, neopentyl glycol di(meth)acrylate, butanediol di(meth)acrylate or trimethylolpropane tri(meth)-acrylate are used.

The abovementioned ethylenically monofunctional and difunctional or polyfunctional compounds may be used alone or in admixture.

Particularly suitable in admixture with the ethylenically monofunctional compounds or the ethylenically difunctional or polyfunctional compounds is a polyester or a polyurethane having an acid number of less than 5, in particular less than 3, which contains on average per molecule up to one polymerizable double bond.

In admixture with ethylenically difunctional or polyfunctional compounds, suitability is likewise possessed by a polyester or a polyurethane having an acid number of less than 5, in particular less than 3, which contains on average per molecule at least 1.5 polymerizable double bonds.

The molecular weight of the polyester or of the polyurethane may be controlled by the quantitative proportion and the functionality of the starting compounds used.

The amount of polymerizable double bonds in the polyester may be controlled by way of the amount of polyols and/or polycarboxylic acids containing a polymerizable double bond that are incorporated into the polyester.

Depending on the viscosity of the polyester prepared, its handling may be made easier by diluting it in low molecular mass, ethylenically monofunctional compounds which are likewise used for the polymerization. Polyols suitable for preparing the polyester are those without a polymerizable double bond, such as ethylene glycol, diethylene glycol, triethylene glycol, tetraethylene glycol, hexaethylene glycol, 1,2-propylene glycol, 1,3-propylene glycol, 1,4-butanediol, 1,5-pentanediol, 1,6-hexanediol, 2,2-dimethylpropanediol, 2,2,4-trimeth-ylpentanediol, 1,3-dimethylolcyclohexane, 1,4-di-methylolcyclohexane, hydroxypivalic acid neopentyl glycol monoester, dimethylolpropionic acid, and perhydrogenated bisphenol A; trimethylolpropane and glycerol; and pentaerythritol, dipentaerythritol, and di(trimethylolpropane).

Suitable polycarboxylic acids without a polymerizable double bond include succinic acid, glutaric acid, adipic acid, azelaic acid, terephthalic acid, phthalic acid, isophthalic acid, endomethylenetetrahydrophthalic acid, 1,2-cyclohexanedicarboxylic acid, 1,3-cyclohexanedicarboxylic acid, 1,4-cyclohexane-dicarboxylic acid, dodecanedioic acid, dodecanedi-carboxylic acid; dimeric and polymeric fatty acids, and trimellitic acid; and the possible anhydrides of the aforementioned acids.

Suitable polyols with a polymerizable double bond are those selected from the group
of 1,4-butenediol, allyl dimethylolpropionate, vinyl dimethylolpropionate, trimethylolpropane monoallyl ether, glycerol monoallyl ether;

the adducts of allyl glycidyl ether or glycidyl (meth)acrylate with a polyester containing a carboxyl group; and the adducts of allyl glycidyl ether or glycidyl (meth)acrylate with dimethylolpropionic acid.

Suitable polycarboxylic acids with a polymerizable double bond include maleic acid, fumaric acid, itaconic acid, citraconic acid, and aconitic acid, and the possible anhydrides thereof.

The amount of polymerizable double bonds in the polyurethane may be controlled by the amount of building blocks containing a polymerizable double bond that are incorporated in the polyurethane.

Depending on the viscosity of the polyurethane prepared, its handling may be made easier by diluting it in those low molecular mass, ethylenically monofunctional compounds which are likewise used for the polymerization.

Polyisocyanates suitable for the preparation of the polyurethane are those from the group of 1,3-bis(1-isocyanato-1-methylethyl)benzene (TMXDI, m-tetramethyl-xylylene diisocyanate), (4,4'-dicyclohexylmethane diisocyanate, Desmodur W), isophorone diisocyanate (IPDI, 3,5,5-trimethyl-1-isocyanato-3-isocyanatomethyl-cyclohexane), and 2,4,6-trioxo-1,3,5-tris(6-isocyanato-hexyl)hexahydro-1,3,5-triazine (Desmodur N3300).

Suitable reaction products with polyisocyanate for preparing the polyurethane include the raw materials that are known from polyurethane chemistry, such as polyesterpolyols, polyetherpolyols, low molecular mass polyols, and diamines.

To incorporate polymerizable double bonds, it is possible to use low molecular mass polyols having polymerizable double bonds, polyesterpolyols which contain building blocks having polymerizable double bonds, and also hydroxyalkyl (meth)acrylates, such as 2-hydroxyethyl (meth)acrylate, 2-hydroxypropyl (meth)-acrylate, 2-hydroxybutyl (meth)acrylate, 1,6-hexanediol mono(meth)acrylate, and 4-hydroxybutyl (meth)acrylate.

Of the polymers used in step a) during the polymerization, the
polyesterpolyol may have a number-average molecular weight of between 700 and 5 000, with particular preference between 750 and 2 000; an acid number of between 35 and 150, with particular preference between 40 and 120; and an OH number of between 150 and 300, with particular preference between 220 and 280;

polyurethane may have a number-average molecular weight of between 700 and 5 000, with particular preference between 750 and 2 500; an acid number of between 30 and 120, with particular preference between 40 and 80; and an OH number of between 150 and 300, with particular preference between 220 and 280; and/or polyacrylate may have a number-average molecular weight of between 2 500 and 20 000, with particular preference between 4 000 and 10 000; an acid number of between 35 and 150, with particular preference between 40 and 125; and an OH number of between 100 and 250, with particular preference between 150 and 200.

This polyesterpolyol used in step a) during the polymerization may contain no polymerizable double bond and may be obtainable from the reaction of at least one polycarboxylic acid without a polymerizable double bond with at least one polyol without a polymerizable double bond.

It is also possible for this polyesterpolyol to contain on average per molecule at least one polymerizable double bond and to be obtainable from the reaction i. of at least one polycarboxylic acid without a polymerizable double bond with at least one polyol having at least one polymerizable double bond;

ii. of at least one polycarboxylic acid having at least one polymerizable double bond with at least one polyol without a polymerizable double bond; or iii. of at least one polycarboxylic acid having at least one polymerizable double bond with at least one polyol having at least one polymerizable double bond.

The latter polyesterpolyol is to be recommended when copolymerization with the vinyl monomers is preferred.

The polycarboxylic acid without a polymerizable double bond is preferably selected from the group of succinic acid, glutaric acid, adipic acid, azelaic acid, terephthalic acid, phthalic acid, isophthalic acid, endomethylenetetra-hydrophthalic acid, 1,2-cyclohexane-dicarboxylic acid, 1,3-cyclohexane-dicarboxylic acid, 1,4-cyclohexane-dicarboxylic acid, dodecanedioic acid, dodecanedicarboxylic acid;

dimeric and polymeric fatty acids, and trimellitic acid;

and the possible anhydrides thereof.

The polyol without a polymerizable double bond may in particular be selected from the group of ethylene glycol, diethylene glycol, triethylene glycol, tetraethylene glycol, hexaethylene glycol, 1,2-propylene glycol, 1,3-propylene glycol, 1,4-butanediol, 1,5-pentanediol, 1,6-hexanediol, 2,2-dimethylpropanediol, 2,2,4-trimethylpentane-diol, 1,3-dimethylolcyclohexane, 1,4-di-methylolcyclohexane, hydroxypivalic acid neopentyl glycol monoester, dimethylol-propionic acid, and perhydrogenated bisphenol A;

trimethylolpropane and glycerol; and pentaerythritol, dipentaerythritol, and di(trimethylolpropane).

The polycarboxylic acid having at least one polymerizable double bond may be selected from the group of maleic acid, fumaric acid, itaconic acid, citraconic acid, and aconitic acid, and the possible anhydrides thereof.

The polyol having at least one polymerizable double bond may in particular comprise 1,4-butenediol, allyl dimethylolpropionate, vinyl dimethylolpropionate, trimethylol-propane monoallyl ether, glycerol monoallyl ether;

the adducts of allyl glycidyl ether or glycidyl (meth) acrylate with a polyester containing a carboxyl group; and the adducts of allyl glycidyl ether or glycidyl (meth) acrylate with dimethylol-propionic acid.

In accordance with a further, inventive embodiment, the polyesterpolyol used in step a) during the polymerization may have been modified by at least one monocarboxylic acid, said monocarboxylic acid being selected from the group of the saturated or unsaturated, isolated or conjugated, linear or branched fatty acids and of benzoic acid or crotonic acid.

The term fatty acid refers to branched or unbranched monocarboxylic acids having from 5 to 22 carbon atoms. Mention is to be made in particular of linoleic acid, oleic acid, soya fatty acid, isononanoic acid or isostearic acid.

The crosslinker to be used in accordance with the invention is preferably an amino resin or a polyisocyanate.

As the polyisocyanate, mention may be made in particular of 1,3-bis(1-isocyanato-1-methylethyl)-benzene (TMXDI, m-tetramethylxylylene diisocyanate), (4,4'-dicyclohexylmethane diisocyanate, Desmodur W), isophorone diisocyanate (IPDI, 3,5,5-trimethyl-1-iso-cyanato-3-isocyanatomethylcyclohexane), and 2,4,6-tri-oxo-1,3,5-tris (6-isocyanatohexyl)hexahydro-1,3,5-triazine (Desmodur N3300). The polyisocyanate may be hydrophilically modified in order thus to achieve more uniform crosslinking of the reaction product.

Particularly outstanding results are obtained with melamine resins.

With a view to industrial preparation of the polymer of the invention, it has proven favorable if the degree of neutralization of the polyesterpolyol throughout the preparation process is between 30 and 100%, in particular between 50 and 80%. This permits a particularly high level of constancy of the desired properties of the polymers prepared.

The selection of the optimum degree of neutralization is known to the skilled worker and may be determined by means of a few laboratory tests.

The polymerization of the polymer of the invention in accordance with step a) takes place using the known techniques suitable for a free-radical polymerization in the aqueous phase. Mention may be made here of the technique of emulsion polymerization.

It is also possible, though not mandatory, for the emulsion polymerization to be conducted using a nozzle jet disperser or a microfluidizer. By this means, more uniform particle size distributions may be achieved.

As polymerization initiators it is possible to use the peroxodisulfates, hydrogen peroxide or else organic peroxides that are customary for emulsion polymerization. It is also possible to use other initiators such as azoisobutyrodinitrile, for example. Initiation of the polymerization by a redox system has proven particularly advantageous. This technique, which is well known in the art of emulsion polymerization, makes use of the fact that hydroperoxides are excited to free-radical decomposition even at very low temperatures by means of suitable reducing agents.

Examples of suitable reducing agents are sodium metabisulfite or its formaldehyde adduct (Na hydroxy-methanesulfinate). Also highly suitable is isoascorbic acid. A particularly advantageous combination is that of tert-butyl hydroperoxide, (iso)ascorbic acid and iron(II) sulfate.

The use of this mixture has the advantage that the polymerization may be initiated at room temperature.

The polymer of the invention may be used in particular for aqueous coating compositions.

One preferred form of use of the invention is its deployment in aqueous basecoat materials, especially effect basecoat materials for the painting of automobiles.

The polymers of the invention provide these aqueous coating compositions with outstanding application characteristics and excellent decorative properties, which are manifested, for example, in a pronounced metallic effect, very good resistance to running on vertical surfaces, freedom from cloudiness, resistance to bleeding by various clearcoat materials, effective covering of sanding marks, and compliance with the specified properties customary in the automobile industry, such as adhesion, stone-chip and condensation resistance.

Accordingly, the polymers of the invention may be used just as effectively to prepare aqueous clearcoat materials, baking varnishes for industrial application, and paints for the architectural sector.

In order to obtain polymers in nonaqueous phase, it is necessary in accordance with one particular embodiment of the invention to remove the water from the polymers of the invention that are present in aqueous phase.

This can be done by any known technique: for example, by spray drying, freeze drying or evaporative concentration, where appropriate under reduced pressure. Following the removal of water, the polymer of the invention may be in powder form or in the form of a resinous mass.

In accordance with one particularly preferred variant of the invention, the polymer in aqueous phase is transferred to a liquid organic phase. This may be done by means of an azeotropic distillation. In this case a possible procedure is to introduce the aqueous polymer dispersion at elevated temperature, where appropriate under reduced pressure, continuously or discontinuously into a reactor which contains an entrainer, i.e., a solvent or a mixture of two or more solvents of which at least one forms an azeotrope with water.

The reactor is equipped with a suitable condenser means and a water separator with a return conduit to the reactor. After the boiling temperature of the azeotrope has been reached, the gaseous azeotropic phase (i.e., entrainer and water) ascends into the condenser means. The azeotrope condenses therein and runs from there into the water separator. In the water separator, phase separation occurs between the entrainer and the water.

In the case of a continuously operated azeotropic distillation, the entrainer flows back into the reactor again, so that only small amounts of entrainer need be used. The water obtained from the water separator is free from organic constituents and may be used again to prepare the aqueous polymer dispersion of the invention.

The entrainer may be selected from the group consisting of xylene, butyl acetate, methyl isobutyl ketone, methyl amyl ketone, pentanol, hexanol and ethylhexanol. A key advantage here is that, following transfer to the organic phase, the entrainer remains in said phase and is of advantage for the use of solventborne coating compositions. With a view to the further use of these organic phase polymers to prepare solventborne coating compositions, the aforementioned entrainers comprise suitable solvents.

Owing to the simultaneous reuse of the entrainer and of the water produced, without additional process steps, this process is notable for an extraordinary degree of environmental compatibility, since no byproducts requiring disposal are produced that in comparison with known preparation processes are obtained in large quantities.

In one particular form of the azeotropic distillation, it is carried out in such a way that the aqueous polymer dispersion is introduced into a mixture of an entrainer and a high-boiling, organic solvent. This high-boiling, organic solvent prevents caking of the polymer on the walls of the reactor during transfer to the organic phase.

The high-boiling solvent may be selected from the group of the glycol esters, such as butyl glycol acetate and/or butyl diglycol acetate, for example.

As in the case of the entrainer, the high-boiling solvent is likewise a component which is customary for a solventborne coating composition.

The polymer of the invention obtainable in this way may be used in particular for solventborne coating compositions.

One preferred form of use of the invention is its deployment in solventborne basecoat materials, especially effect basecoat materials and clearcoat materials for the topcoating or finishing of automobiles.

This organic phase polymer of the invention gives these solventborne coating compositions likewise excellent application properties and outstanding decorative properties, which are manifested, for example, in a pronounced metallic effect, very good resistance to running on vertical surfaces (SCA—sagging control agent), freedom from cloudiness, resistance to bleeding by clearcoat material, effective coverage of sanding marks, and compliance with the properties normally specified in the automobile industry.

The polymers of the invention may be used with equal effectiveness to prepare solventborne clearcoat materials, coil coating compositions and baking varnishes for industrial applications, and also paints for the architectural sector.

Another particular feature of the polymer of the invention is its high shear stability. This property allows such polymers to be used for the first time to prepare pigment formulations, especially as grinding media for tinting pastes. As a result, the tinting pastes thus prepared combine a high pigment content with low viscosity.

The examples which follow serve to illustrate the invention.

EXAMPLES

Preparation of the Starting Products Polyester Dispersion 1

292.2 g of 1,6-hexanediol, 1 386.9 g of a dimerized fatty acid (Pripol® 1013 from Unichema) and 1 238.3 g of ditrimethylolpropane are weighed out into a 10 l reaction vessel with stirrer and packed column and are heated in such a way that the column overhead temperature does not exceed 100° C. The max. esterification temperature is 220° C. At an acid number below 10, the batch is cooled. At 150° C., 475.5 g of trimellitic anhydride are added and the mixture is heated such that the column overhead temperature does not exceed 100° C. The maximum esterification temperature is 170° C. At an acid number of 40, the batch is cooled. This gives a polyester having a calculated molecular weight of 1 400 and a hydroxyl number of 250.

At a temperature below 100° C., a mixture of 124 g of dimethylethanolamine and 4 012 g of fully deionized water is metered in and then 1 902 g of fully deionized water are added. This gives a stable dispersion having a solids content of 35% (60 minutes at 120° C.) and a pH of 5.60. The degree of neutralization is 60%.

Polyester Dispersion 2

332.8 g of neopentyl glycol, 283.2 g of hexanediol, 696 g of a dimerized fatty acid (Pripol® 1013 from Unichema) and 184.2 g of hexahydrophthalic anhydride are weighed out into a 4 l reaction vessel with stirrer and packed column and are heated in such a way that the column overhead temperature does not exceed 100° C. The max. esterification temperature is 220° C. At an acid number below 10, the batch is cooled. At 150° C., 307.2 g of trimellitic anhydride are added and the mixture is heated such that the column overhead temperature does not exceed 100° C. The max esterification temperature is 180°0 C. At an acid number of 30, the batch is cooled. This gives a polyester having a calculated molecular weight of 1 870 and a hydroxyl number of 83.

At a temperature below 100° C., a mixture of 42.7 g of dimethylethanolamine and 1 380 g of fully deionized water is metered in and then 1 910 g of fully deionized water are added. This gives a stable dispersion having a solids content of 30% (60 minutes at 120° C.) and a pH of 5.53. The degree of neutralization is 60%.

Polyester 3 (For Preparing the PU Dispersion 2)

1 352 g of neopentyl glycol are weighed out into a 4 l reaction vessel with stirrer and packed column and are heated to 140° C. At 140° C., 1 348 g of trimellitic anhydride are added and the mixture is heated in such a way that the column overhead temperature does not exceed 100° C. The maximum esterification temperature is 160° C. At an acid number of 150, the batch is cooled and diluted with 810 g of methyl ethyl ketone. This gives a polyester having a calculated molecular weight of 380 and a hydroxyl number of 295.

Polyacrylate Dispersion 1

200 g of methyl ethyl ketone are weighed out into a 4 l reaction vessel with stirrer and 2 feed vessels, and are heated to 80° C. At 80° C., a mixture of 289.6 9 of 2-ehtylhexyl acrylate, 250.3 g of 4-hydroxybutyl acrylate and 100.1 g of acrylic acid is metered in at a uniform rate over the course of 2 hours from one feed vessel. From a second feed vessel, a mixture of 24 g of azoisobutyrodinitrile and 160 g of methyl ethyl ketone is metered in at a uniform rate over the course of 2.5 hours. Both feeds are started at the same time. After the end of the second feed, polymerization is continued for 1.5 hours.

Thereafter, a mixture of 12.4 g of dimethylethanolamine and 900 g of fully deionized water is added and the methyl ethyl ketone is then removed by vacuum distillation. This gives a stable dispersion having an acid number of 121 and a solids content of 43% (60 minutes at 120° C.).

Polyurethane Dispersion 1 (For Paint Examples)

602.3 g of a polyester having a number-average molecular weight of 1 440, based on a dimerized fatty acid (Pripol® 1013 from Unichema) and 1,6-hexanediol, with an acid number below 3, 56 g of dimethylol-propionic acid, 306.2 g of tetramethylxylylene diisocyanate, 241 g of methyl ethyl ketone and 0.9 g of dibutyltin dilaurate are weighed out into a 6 l reaction vessel with reflux condenser. This mixture is held at 80° C. until the isocyanate content is 2.35%. Then 90.4 g of trimethylolpropane and 23 g of methyl ethyl ketone are added and reaction is continued at 80° C. to an isocyanate content of <0.03%. Thereafter a mixture of 33.5 g of dimethylethanolamine and 1 085 g of fully deionized water, and subsequently 1 598 g of fully deionized water, are added. A vacuum distillation in which the methyl ethyl ketone is removed gives a dispersion having a solids content of 28% (60 minutes at 120° C.).

Polyurethane Dispersion 2

319.2 g of polyester 3, 150 g of ditrimethylolpropane, 201 g of methy ethyl ketone and 0.5 g of dibutyltin dilaurate are weighed out into a 2 l reaction vessel with reflux condenser. This mixture is heated to 70° C. At 70° C., 265.9 g of tetramethylxylylene diisocyanate are metered in over the course of one hour. After the metering, reaction is continued at 80° C. until the isocyanate content is <0.03%. Then a mixture of 32.1 g of dimethylethanolamine and 935 g of fully deionized water is added. A vacuum distillation in which the methyl ethyl ketone is removed gives a dispersion having a solids content of 40% (60 minutes at 120° C.).

Preparation of the Polymers of the Invention
Polymer Dispersion 1

720 g of polyester dispersion 1 are weighed out into a 4 l reaction vessel with reflux condenser and one feed vessel, and 106 g of butyl acrylate, 16.5 g of methyl methacrylate, 3.5 g of allyl methacrylate and 119 g of fully deionized water are added in succession with stirring. Thereafter a mixture of 0.38 g of ascorbic acid and 13.1 g of fully deionized water and a mixture of 0.0025 g of iron(II) sulfate and 12.6 g of fully deionized water are added. Then a mixture of 0.63 g of tert-butyl hydroperoxide (70% strength in water) and 14.4 g of fully deionized water is metered in over the course of 10 minutes and the polymerization is initiated. The temperature rises to 41° C.

One hour after the polymerization has reached maximum temperature, 227.1 g of butyl acrylate, 24.9 g of hydroxyethyl acrylate and 252 g of fully deionized water are added in succession at 30° C. Thereafter a mixture of 0.76 g of ascorbic acid and 26.2 g of fully deionized water and a mixture of 0.005 g of iron(II) sulfate and 25.6 g of fully deionized water are added. Then a mixture of 1.26 g of tert-butyl hydroperoxide (70% strength in water) and 28.8 g of fully deionized water is metered in over the course of 10 minutes and the polymerization is initiated. The temperature rises to 45° C. One hour after the polymerization has reached maximum temperature, a mixture of 0.38 g of ascorbic acid and 20 g of fully deionized water is metered in over 5 minutes at 35° C.

After 15 minutes, 303 g of a commercial melamine resin (Cymel® 327 from Dyno Cytec) and 718 g of fully deionized water are added to the batch. The batch is heated to 80° C. and condensed at this temperature for 5 hours. It is then cooled and 6.4 g of dimethyl-ethanolamine are added.

This gives a stable dispersion having a solids content of 26% (60 minutes at 120° C.). A sample of this dispersion diluted with tetrahydrofuran exhibits severe turbidity.

Polymer Dispersion 2

720 g of polyester dispersion 1 are weighed out into a 4 l reaction vessel with reflux condenser and one feed vessel, and 126 g of butyl acrylate and 119 g of fully deionized water are added in succession with stirring. Thereafter a mixture of 0.38 g of ascorbic acid and 13.1 g of fully deionized water and a mixture of 0.0025 g of iron(II) sulfate and 12.6 g of fully deionized water are added.

Then a mixture of 0.63 g of tert-butyl hydroperoxide (70% strength in water) and 14.4 g of fully deionized water is metered in over the course of 10 minutes and the polymerization is initiated. The temperature rises to 39° C. One hour after the polymerization has reached maximum temperature, 195.3 g of butyl acrylate and 56.7 9 of ethylene glycol dimethacrylate are added in succession at 30° C.

Thereafter a mixture of 0.76 g of ascorbic acid and 26.2 g of fully deionized water and a mixture of 0.005 g of iron(II) sulfate and 25.6 g of fully deionized water are added.

Then a mixture of 1.26 g of tert-butyl hydroperoxide (70% strength in water) and 28.8 g of fully deionized water is metered in over the course of 10 minutes and the polymerization is initiated. The temperature rises to 59° C. One hour after the polymerization has reached maximum temperature, a mixture of 0.38 g of ascorbic acid and 20 g of fully deionized water is metered in over 5 minutes at 35° C.

After 15 minutes, 303 g of a commercial melamine resin (Cymel® 327 from Dyno Cytec) and 641 g of fully deionized water are added to the batch. The batch is heated to 80° C. and condensed at 80° C. for 5 hours. It is then cooled and 6.4 g of dimethylethanolamine are added.

This gives a stable dispersion having a solids content of 34% (60 minutes at 120° C.). A sample of this dispersion diluted with tetrahydrofuran exhibits severe turbidity.

Polymer Dispersion 3

720 g of polyester dispersion 1 are weighed out into a 4 l reaction vessel with reflux condenser and one feed vessel, and 252.8 g of butyl acrylate, 7.8 g of hexane-diol diacrylate and 240 g of fully deionized water are added in succession with stirring. Thereafter a mixture of 0.79 g of ascorbic acid and 23.5 g of fully deionized water and a mixture of 0.0034 g of iron(II) sulfate and 26.1 g of fully deionized water are added. Then a mixture of 1.87 g of tert-butyl hydroperoxide (70% strength in water) and 29.5 g of fully deionized water is metered in over the course of 10 minutes and the polymerization is initiated. The temperature rises to 46° C. One hour after the polymerization has reached maximum temperature, 221 g of butyl acrylate, 39.1 g of ethylene glycol dimethacrylate and 310 g of fully deionized water are added in succession at 30° C. Thereafter a mixture of 0.79 g of ascorbic acid and 23.5 g of fully deionized water and a mixture of 0.0034 g of iron(II) sulfate and 26.1 g of fully deionized water are added. Then a mixture of 1.87 g of tert-butyl hydroperoxide (70% strength in water) and 29.5 g of fully deionized water is metered in over the course of 10 minutes and the polymerization is initiated. The temperature rises to 44° C.

One hour after the polymerization has reached maximum temperature, a mixture of 0.4 g of ascorbic acid and 12 g of fully deionized water is metered in over 5 minutes at 35° C.

After 15 minutes, 31.1 g of a commercial melamine resin (Cymel® 327 from Dyno Cytec) and 290 g of fully deionized water are added to the batch. The batch is heated to 80° C. and condensed at 80° C. for 5 hours. It is then cooled and 6.4 g of dimethylethanolamine are added.

This gives a stable dispersion having a solids content of 31% (60 minutes at 120° C.). A sample of this dispersion diluted with tetrahydrofuran exhibits severe turbidity.

Polymer Dispersion 4

720 g of polyester dispersion 1 are weighed out into a 4 l reaction vessel with reflux condenser and one feed vessel, and 453.6 g of butyl acrylate and 446 g of fully deionized water are added in succession with stirring. Thereafter a mixture of 1.37 g of ascorbic acid and 47.2 g of fully deionized water and a mixture of 0.009 g of iron(II) sulfate and 45.4 g of fully deionized water are added.

Then a mixture of 2.27 g of tert-butyl hydroperoxide (70% strength in water) and 51.8 g of fully deionized water is metered in over the course of 10 minutes and the polymerization is initiated. The temperature rises to 58° C. One hour after the polymerization has reached maximum temperature, 50.4 g of methyl methacrylate and 240 g of fully deionized water are added in succession at 30° C. Thereafter a mixture of 0.15 g of ascorbic acid and 5.2 g of fully deionized water and a mixture of 0.001 g of iron(II) sulfate and 5 g of fully deionized water are added. Then a mixture of 0.25 g of tert-butyl hydroperoxide (70% strength in water) and 5.8 g of fully deionized water is metered in over the course of 10 minutes and the polymerization is initiated. The temperature rises to 34° C. One hour after the polymerization has reached maximum temperature, a mixture of 0.4 g of ascorbic acid and 12 g of fully deionized water is metered in over 5 minutes at 35° C.

After 15 minutes, 120 g of a commercial melamine resin (Cymel® 327 from Dyno Cytec) and 334 g of fully deionized water are added to the batch. The batch is heated to 80° C and condensed at 80° C. for 5 hours. It is then cooled and 6.4 g of dimethylethanolamine are added.

This gives a stable dispersion having a solids content of 30% (60 minutes at 120° C.). A sample of this dispersion diluted with tetrahydrofuran exhibits severe turbidity.

Polymer Dispersion 5

645 g of polyurethane dispersion 2 are weighed out into a 4l. reaction vessel with ref lux condenser and 253 g of butyl acrylate, 5.3 g of allyl methacrylate, 1 g of dimethylethanolamine and 611 g of fully deionized water are added in succession with stirring. Thereafter a mixture of 0.8 g of ascorbic acid and 26.9 g of fully deionized water and a mixture of 0.0034 g of iron(II) sulfate and 25.5 g of fully deionized water are added. Then a mixture of 1.3 g of tert-butyl hydroperoxide (70% strength in water) and 29.4 g of fully deionized water is metered in over the course of 10 minutes and the polymerization is initiated. The temperature rises to 35° C.

One hour after the polymerization has reached maximum temperature, 250 g of butyl acrylate and 7.8 g of ethylene glycol dimethacrylate are added at 35° C. Thereafter a mixture of 0.8 g of ascorbic acid and 26.9 g of fully deionized water and a mixture of 0.0034 g of iron(II) sulfate and 25.5 g of fully deionized water are added. Then a mixture of 1.3 g of tert-butyl hydroperoxide (70% strength in water) and 29.4 g of fully deionized water is metered in over the course of 10 minutes and the polymerization is initiated. The temperature rises to 56° C.

After 15 minutes, 122.9 g of a commercial melamine resin. (Cymel® 327 from Dyno Cytec) and 470 g of fully deionized water are added to the batch. The batch is heated to 80° C. and condensed at this temperature for 4 hours. It is then cooled and 5.8 g of dimethyl-ethanolamine are added.

This gives a stable dispersion having a solids content of 33% (60 minutes at 120° C.). A sample of this dispersion diluted with tetrahydrofuran exhibits severe turbidity.

Polymer Dispersion 6

233 g of acrylate dispersion 1 are weighed out into a 2 l reaction vessel with reflux condenser and 200 g of butyl acrylate, 5.8 g of dimethylethanolamine and 284 g of fully deionized water are added in succession with stirring. Thereafter a mixture of 0.6 g of ascorbic acid and 22 g of fully deionized water and a mixture of 0.008 g of iron(II) sulfate and 33 g of fully deionized water are added. Then a mixture of 1.5 g of tert-butyl hydroperoxide (70% strength in water) and 24 g of fully deionized water is metered in over the course of 10 minutes and the polymerization is initiated. The temperature rises to 55° C.

One hour after the polymerization has reached maximum temperature, 194 g of butyl acrylate and 6 g of allyl methacrylate are added at 35° C. Thereafter a mixture of 0.6 g of ascorbic acid and 22 g of fully deionized water and a mixture of 0.008 g of iron(II) sulfate and 33 g of fully deionized water are added. Then a mixture of 1.5 g of tert-butyl hydroperoxide (70% strength in water) and 24 g of fully deionized water is metered in over the course of 10 minutes and the polymerization is initiated. The temperature rises to 67° C.

After 15 minutes, 53.5 g of a commercial melamine resin (Cymel® 327 from Dyno Cytec) and 64 g of fully deionized water are added to the batch. The batch is heated to 80° C. and condensed at this temperature for 4 hours. It is then cooled and a mixture of 9.9 g of dimethylethanolamine and 90 g of fully deionized water is added.

This gives a stable dispersion having a solids content of 35% (60 minutes at 120° C.). A sample of this dispersion diluted with tetrahydrofuran exhibits severe turbidity.

Use of the Polymers of the Invention

Use Example 1

To prepare a metallic aqueous basecoat material, 107.1 g of polyurethane dispersion 1 and 288.5 g of the inventive polymer dispersion 1, a mixture of 50 g of polyester dispersion 2, 0.4 g of dimethylethanolamine and 35 g of fully deionized water, 16.6 g of a commercial melamine resin (Cymel® 327 from Dyno Cytec), 42.9 g of a commercial aluminum bronze, pasted beforehand in 56.2 g of butyl glycol and 31.6 g of n-butanol and a mixture of 24.6 g of a commercial acrylate thickener (Latekoll® D from BASF) and 46 g of fully deionized water are processed to a paint. The pH is adjusted to 8.00–8.30 using dimethylethanolamine and the viscosity to 101 mPa·s (measured at 1000 s$^{-1}$) using fully deionized water.

Use Example 2

The procedure of example 1 is repeated. However, the 288.5 g of polymer dispersion 1 are replaced by 220.6 g of the inventive polymer dispersion 2.

Use Example 3

The procedure of example 1 is repeated. However, the 288.5 g of polymer dispersion 1 are replaced by 241.9 g of the inventive polymer dispersion 3.

Use Example 4

The procedure of example 1 is repeated. However, the 288.5 g of polymer dispersion 1 are replaced by 250 9 of the inventive polymer dispersion 4.

Use Example 5

The procedure of example 1 is repeated. However, the 288.5 g of polymer dispersion 1 are replaced by 234.4 g of polymer dispersion 5.

Use Example 6

The procedure of example 1 is repeated. However, the 288.5 9 of polymer dispersion 1 are replaced by 214.3 g of polymer dispersion 6.

Comparative example 1

The procedure of example 1 is repeated. However, the 288.5 g of polymer dispersion 1 are replaced by 250 g of a microgel dispersion prepared in accordance with example 4b) of EP-0 808 333 B1.

Comparative Example 2

The procedure of paint example 1 is repeated. However, the 288.5 9 of polymer dispersion 1 are replaced by 125 g of a microgel dispersion prepared in accordance with example 4b) of EP-0 808 333 and 110.3 g of a microgel dispersion prepared from example 9 from DE 39 40 316.

Comparative Example 3

The amount of prepared microgel dispersion indicated in example 4b from EP-0 808 333 B1 is subsequently admixed with 492 g of a commercial melamine resin (Cymel® 327 from Dyno Cytec) and 500 g of fully deionized water and the batch is heated to 80° C. On reaching the temperature of 80° C. the batch coagulates and so is not available for further processing.

Testing of the Adhesion Under Powder/powder Slurry

The aqueous basecoat materials prepared in accordance with the use and comparative examples described above are each sprayed onto two steel panels measuring 10×20 cm, coated with a commercial electrocoat material (Enviro Prime from PPG) and a commercial primer-surfacer, so as to give paint films having a dry film thickness of 12–15 µm. Following initial drying at 60° C. for a time of 5 minutes, the applied wet films are each coated with a commercial powder clearcoat material (PCC 10106 from PPG, dry film thickness 65 µm) and with a powder clearcoat slurry (prepared in accordance with the example from DE 196 13 547 C2, dry film thickness 40 µm) and then, after initial drying at 60° C. for 10 minutes, are baked at 140° C. for 30 minutes.

The finished coatings are investigated in accordance with the EN/ISO specification 2409 (by means of cross-cutting). The results of these investigations are indicated in the table below. In the table, "Gt 0" denotes very good and "Gt 5" denotes completely unusable. The limit accepted by the automobile industry is Gt 1.

Testing of the Tendency Toward Mudcracking Under Powder Slurry

The aqueous basecoat materials prepared in accordance with the use and comparative examples described above are each sprayed onto a steel panel with a size of 20×50 cm, coated with a commercial electrocoat material (Enviro Prime from PPG) and with a commercial primer-surfacer, in such a way as to give a dry film thickness of 15 µm. Coating is then carried out with a powder clearcoat slurry (prepared in accordance with the example from DE 196 13 547 C2, dry film thickness 45 µm). After initial drying at 50° C. for 10 minutes, the films are baked at 150° C. for 30 minutes.

The appearance of mudcracking is assessed visually.

Testing of the Runproofness

The aqueous basecoat materials prepared in accordance with the use and comparative examples described above are applied by means of an automatic sprayer with compressed-air atomization to a vertical perforated panel having a dry film thickness—constructed in the form of a wedge—of 10–35 µm. After 3 minutes' flashoff, the panels are initially dried at 80° C. for 5 minutes in the vertical position and are then baked at 130° C. for 10 minutes. The value reported is the film thickness of the basecoat at which the first runs are observed.

The results of the individual tests are set out in table I below.

TABLE I

| Paint examples | Viscosity (at 1 000 s⁻¹) | Adhesion under slurry | Mud-cracking | Adhesion under powder | Running limit |
|---|---|---|---|---|---|
| Example 1 | 101 mPas | Gt 0–1 | no | Gt 0–1 | 30 μm |
| Example 2 | 99 mPas | Gt 0–1 | no | Gt 0–1 | 29 μm |
| Example 3 | 103 mPas | Gt 0–1 | no | Gt 0–1 | 32 μm |
| Example 4 | 103 mPas | Gt 0 | no | Gt 0 | 27 μm |
| Example 5 | 104 mPas | Gt 0–1 | no | Gt 0–1 | 28 μm |
| Example 6 | 106 mPas | Gt 0–1 | no | Gt 0–1 | 26 μm |
| Comparative ex. 1 | 101 mPas | Gt 2 | no | Gt 2 | 14 μm |
| Comparative ex. 2 | 98 mPas | Gt 5 | yes | Gt 5 | 18 μm |

Table I clearly shows that the use of the polymers of the invention results in coatings which are distinguished by very good adhesion under clearcoat materials based on powder or powder slurry.

Furthermore, the inventive examples exhibit very good aluminum orientation and also an excellent topcoat holdout.

What is claimed is:

1. A polymer microparticle dispersed in an aqueous phase and with a fully crosslinked exterior, obtained by a multi-stage polymerization process which involves conducting
   a) in a first step, an aqueous-phase polymerization of a monomer mixture comprising
      i) from 7.5 to 93% by weight of at least one ethylenically monofunctional compound;
      ii) from 0.3 to 47.5% by weight of at least one ethylenically difunctional or polyfunctional compound;
      in the presence of a polymer selected from a
         polyesterpolyol having a number-average molecular weight of from 500 to 10,000, an acid number of between 22 and 224, and an OH number of between 60 to 400;
         polyurethane having a number-average molecular weight of from 500 to 20,000, an acid number of between 25 and 150, and an OH number of between 50 to 350, said polyurethane containing on average per molecule at least one free carboxyl group originating from a polyesterpolyol; and
         polyacrylate having a number-average molecular weight of from 2,000 to 100,000, an acid number of between 25 and 300, and an OH number of between 50 to 250;
   b) in a subsequent step, a reaction of the product obtained from step a) with iii) from 5 to 85% by weight of at least one ethylenically monofunctional compound;
   the sum of the fractions of components (i) to (iii) being 100% by weight; followed by a reaction of the product obtained from step b) with a crosslinker.

2. A polymer microparticle dispersed in an aqueous phase and with a fully crosslinked exterior, obtained by a multi-stage polymerization process which involves conducting
   a) in a first step, an aqueous-phase polymerization of a monomer mixture comprising
      i) from 15 to 95% by weight of at least one ethylenically monofunctional compound;
      in the presence of a polymer selected from a
         polyesterpolyol having a number-average molecular weight of from 500 to 10,000, an acid number of between 22 and 224, and an OH number of between 60 to 400;
         polyurethane having a number-average molecular weight of from 500 to 20,000, an acid number of between 25 and 150, and an OH number of between 50 to 350, said polyurethane containing on average per molecule at least one free carboxyl group originating from a polyesterpolyol; and
         polyacrylate having a number-average molecular weight of from 2,000 to 100,000, an acid number of between 25 and 300, and an OH number of between 50 to 250;
   b) in a subsequent step, a reaction of the product obtained from step a) with ii) from 2.5 to 83% by weight of at least one ethylenically monofunctional compound;
      iii) from 0.1 to 42.5% by weight of at least one ethylenically difunctional or polyfunctional compound;
   the sum of the fractions of components (i) to (iii) being 100% by weight;
   followed by a reaction of the product obtained from step b) with a crosslinker.

3. A polymer microparticle dispersed in an aqueous phase and with a fully crosslinked exterior, obtained by a multi-stage polymerization process which involves conducting
   a) in a first step, an aqueous-phase polymerization of a monomer mixture comprising
      i) from 7.5 to 93% by weight of at least one ethylenically monofunctional compound;
      ii) from 0.3 to 47.5% by weight of at least one ethylenically difunctional or polyfunctional compound;
      in the presence of a polymer selected from a
         polyesterpolyol having a number-average molecular weight of from 500 to 10,000, an acid number of between 22 and 224, and an OH number of between 60 to 400;
         polyurethane having a number-average molecular weight of from 500 to 20,000, an acid number of between 25 and 150, and an OH number of between 50 to 350, said polyurethane containing on average per molecule at least one free carboxyl group originating from a polyesterpolyol; and
         polyacrylate having a number-average molecular weight of from 2.000 to 100.000, an acid number of between 25 and 300, and an OH number of between 50 to 250;
   b) in a subsequent step, a reaction of the product obtained from step a) with
      iii) from 2.5 to 83% by weight of at least one ethylenically monofunctional compound;
      (iv) from 0.1 to 42.5% by weight of at least one ethylenically difunctional or polyfunctional compound;
   the sum of the fractions of components (i) to (iv) being 100% by weight;
   followed by a reaction of the product obtained from step b) with a crosslinker.

4. A polymer microparticle dispersed in an aqueous phase and with a fully crosslinked exterior, obtained by a multi-stage polymerization process which involves conducting
   a) in a first step, an aqueous-phase polymerization of a monomer mixture comprising
      i) from 15 to 95% by weight of at least one ethylenically monofunctional compound;
      in the presence of a polymer selected from a
         polyesterpolyol having a number-average molecular weight of from 500 to 10,000, an acid number of between 22 and 224, and an OH number of between 60 to 400;
         polyurethane having a number-average molecular weight of from 500 to 20,000, an acid number of between 25 and 150, and an OH number of between 50 to 350, said polyurethane containing on average per molecule at least one free carboxyl group originating from a polyesterpolyol; and polyacrylate having a number-average molecular weight of from 2,000 to 100,000, an acid number of between 25 and 300, and an OH number of between 50 to 250;

b) in a subsequent step, a reaction of the product obtained from step a) with ii) from 5 to 85% by weight of at least one ethylenically monofunctional compound;

the sum of the fractions of components (i) and (ii) being 100% by weight;

followed by a reaction of the product obtained from step b) with a crosslinker.

5. The polymer microparticle dispersed in an aqueous phase and with a fully crosslinked exterior, as claimed in claim 3, characterized in that the ethylenically difunctional or polyfunctional compound in steps a) and b) is the same.

6. The polymer microparticle dispersed in an aqueous phase and with a fully crosslinked exterior, as claimed in claim 3, characterized in that the ethylenically difunctional or polyfunctional compound in steps a) and b) is different.

7. The polymer microparticle dispersed in an aqueous phase and with a fully crosslinked exterior, as claimed in claim 1, characterized in that the ethylenically monofunctional compound in steps a) and b) is the same.

8. The polymer microparticle dispersed in an aqueous phase and with a fully crosslinked exterior, as claimed in claim 1, characterized in that the ethylenically monofunctional compound in steps a) and b) is different.

9. The polymer microparticle dispersed in an aqueous phase and with a fully crosslinked exterior, as claimed in claim 1, characterized in that the polymer selected from a polyesterpolyol, polyurethane and/or polyacrylate contains on average per molecule at least one free carboxyl group that originates from trimellitic acid or trimellitic anhydride.

10. The polymer microparticle dispersed in an aqueous phase and with a fully crosslinked exterior, as claimed in claim 1, characterized in that the ethylenically monofunctional compound is selected from the group of the alkyl esters or hydroxyalkyl esters of acrylic or methacrylic acid.

11. The polymer microparticle dispersed in an aqueous phase and with a fully crosslinked exterior, as claimed in claim 10, characterized in that the ethylenically monofunctional compound is vinyl acetate, vinyltoluene, styrene, acrylamide or an alkyl (meth)acrylate or hydroxyalkyl (meth)acrylate having from 1 to 18 carbon atoms in the alkyl radical.

12. The polymer microparticle dispersed in an aqueous phase and with a fully crosslinked exterior, as claimed in claim 11, characterized in that the alkyl (meth)acrylate is selected from the group of lauryl acrylate, isobornyl (meth)acrylate, cyclohexyl (meth)acrylate, tert-butylcyclohexyl (meth)acrylate, benzyl (meth)acrylate, glycidyl (meth)acrylate, and trimethylcyclohexyl (meth)acrylate.

13. The polymer microparticle dispersed in an aqueous phase and with a fully crosslinked exterior, as claimed in claim 11, characterized in that the alkyl (meth)acrylate is selected from the group of a-ethylhexyl (meth)acrylate, methyl (meth)acrylate, n-butyl (meth)acrylate, and tert-butyl (meth)acrylate.

14. The polymer microparticle dispersed in an aqueous phase and with a fully crosslinked exterior, as claimed in claim 11, characterized in that the hydroxyalkyl (meth)acrylate is selected from the group of 2-hydroxyethyl (meth)acrylate, 2-hydroxy-propyl (meth)acrylate, 2-hydroxybutyl (meth)-acrylate, hexane-1,6-diol mono(meth)acrylate, and 5 4-hydroxybutyl (meth)acrylate.

15. The polymer microparticle dispersed in an aqueous phase and with a fully crosslinked exterior, as claimed in claim 1, characterized in that the ethylenically difunctional or polyfunctional compound is selected from the group of the diacrylates, triacrylates and/or (meth)acrylic esters of polyfunctional alcohols.

16. The polymer microparticle dispersed in an aqueous phase and with a fully crosslinked exterior, as claimed in claim 15, characterized in that the ethylenically difunctional or polyfunctional compound is allyl (meth)acrylate, hexanediol di(meth)acrylate, ethylene glycol di(meth)-acrylate, neopentyl glycol di(meth)acrylate, butanediol di(meth)acrylate or trimethylolpropane tri(meth)acrylate.

17. The polymer microparticle dispersed in an aqueous phase and with a fully crosslinked exterior, as claimed in claim 1, characterized in that the ethylenically monofunctional compound is in part a polyester or polyurethane having an acid number of less than 5, in particular less than 3, which contains on average per molecule up to one polymerizable double bond.

18. The polymer microparticle dispersed in an aqueous phase and with a fully crosslinked exterior, as claimed in claim 1, characterized in that the ethylenically difunctional or polyfunctional compound is in part a polyester or polyurethane having an acid number of less than 5, in particular less than 3, which contains on average per molecule at least 1.5 polymerizable double bonds.

19. The polymer microparticle dispersed in an aqueous phase and with a fully crosslinked exterior, as claimed in claim 1, characterized in that of the polymers used in step a) during the polymerization the polyesterpolyol has a number-average molecular weight of between 700 and 5,000, with particular preference between 750 and 2,000; an acid number of between 35 and 150, with particular preference between 40 and 120; and an OH number of between 150 and 300, with particular preference between 220 and 280;

polyurethane has a number-average molecular weight of between 700 and 5,000, with particular preference between 750 and 2,500; an acid number of between 30 and 120, with particular preference between 40 and 80; and an OH number of between 150 and 300, with particular preference between 220 and 280; and polyacrylate has a number-average molecular weight of between 2,500 and 20,000, with particular preference between 4,000 and 10,000; an acid number of between 35 and 150, with particular preference between 40 and 125; and an OH number of between 100 and 250, with particular preference between 150 and 200.

20. The polymer microparticle dispersed in an aqueous phase and with a fully crosslinked exterior, as claimed in claim 1, characterized in that the polyesterpolyol used in step a) during the polymerization contains no polymerizable double bond and is obtained from the reaction of at least one polycarboxylic acid without a polymerizable double bond with at least one polyol without a polymerizable double bond.

21. The polymer microparticle dispersed in an aqueous phase and with a fully crosslinked exterior, as claimed in claim 1, characterized in that the polyesterpolyol contains on average per molecule at least one polymerizable double bond and is obtained from the reaction i) of at least one polycarboxylic acid without a polymerizable double bond with at least one polyol having at least one polymerizable double bond;

ii) of at least one polycarboxylic acid having at least one polymerizable double bond with at least one polyol without a polymerizable double bond; or iii) of at least one polycarboxylic acid having at least one polymerizable double bond with at least one polyol having at least one polymerizable double bond.

22. The polymer microparticle dispersed in an aqueous phase and with a fully crosslinked exterior, as claimed in claim 20, characterized in that the polycarboxylic acid without a polymerizable double bond is selected from the group of succinic acid, glutaric acid, adipic acid, azelaic acid, terephthalic acid, phthalic acid, isophthalic acid, endomethylenetetrahydrophthalic acid, 1,2-cyclohexanedicarboxylic acid, 1,3-cyclohexanedicarboxylic acid, 1,4-cyclohexanedicarboxylic acid, dodecanedioic acid, dodecanedi-carboxylic acid;

dimeric and polymeric fatty acids, and trimellitic acid; and the possible anhydrides thereof.

23. The polymer microparticle dispersed in an aqueous phase and with a fully crosslinked exterior, as claimed in claim 20, characterized in that the polyol without a polymerizable double bond is selected from the group of ethylene glycol, diethylene glycol, triethylene glycol, tetraethylene glycol, hexaethylene glycol, 1,2-propylene glycol, 1,3-propylene glycol, 1,4-butanediol, 1,5-pentanediol, 1,6-hexanediol, 2,2-dimethylpropanediol, 2,2,4-trimethylpentanediol, 1,3-dimethylolcyclohexane, 1,4-dimethylol-cyclohexane, hydroxy-pivalic acid, neopentyl glycol monoester, dimethylolpropionic acid, and perhydrogenated bisphenol A;

trimethylolpropane and glycerol; and pentaerythritol, dipentaerythritol, and di(trimethylolpropane).

24. The polymer microparticle dispersed in an aqueous phase and with a fully crosslinked exterior, as claimed in claim 21, characterized in that the polycarboxylic acid having at least one polymerizable double bond is selected from the group of maleic acid, fumaric acid, itaconic acid, citraconic acid, and aconitic acid, and the possible anhydrides thereof.

25. The polymer microparticle dispersed in an aqueous phase and with a fully crosslinked exterior, as claimed in claim 21, characterized in that the polyol having at least one polymerizable double bond is selected from the group of 1,4-butenediol, allyl dimethylolpropionate, vinyl dimethylolpropionate, trimethylolpropane monoallyl ether, glycerol monoallyl ether;

the adducts of allyl glycidyl ether or glycidyl (meth) acrylate with a polyester containing a carboxyl group; and the adducts of allyl glycidyl ether or glycidyl (meth) acrylate with dimethlolpropionic acid.

26. The polymer microparticle dispersed in an aqueous phase and with a fully crosslinked exterior, as claimed in claim 19, characterized in that the polyesterpolyol has been modified by at least one monocarboxylic acid selected from the group of the saturated or unsaturated, isolated or conjugated, linear or branched fatty acids and of benzoic acid or crotonic acid.

27. The polymer microparticle dispersed in an aqueous phase and with a fully crosslinked exterior, as claimed in claim 26, characterized in that the fatty acid has from 5 to 22 carbon atoms and in particular is linoleic acid, oleic acid, soya fatty acid, isononanoic acid or isostearic acid.

28. The polymer microparticle dispersed in an aqueous phase and with a fully crosslinked exterior, as claimed in claim 1, characterized in that the crosslinker is an amino resin or a polyisocyanate.

29. The polymer microparticle dispersed in an aqueous phase and with a fully crosslinked exterior, as claimed in claim 28, characterized in that the amino resin is a melamine resin.

30. The polymer microparticle dispersed in an aqueous phase and with a fully crosslinked exterior, as claimed in claim 28, characterized in that the polyisocyanate is selected from the group of 1,3-bis(1-isocyanato-1-methylethyl) benzene (TMXI, m-tetramethylxylylene diisocyanate), (4,4'-di-cyclohexylmethane diisocyanate, Desmodur W), isophorone diisocyanate (IPDI, 3,5,5-trimethyl-1-isocyanato-3-isocyanatomethylcyclohexane), and 2,4,6-trioxo-1,3,5-tris (6-isocyanatohexyl)hexa-hydro-1,3,5-triazine (Desmodur N3300).

31. The polymer microparticle dispersed in an aqueous phase and with a fully crosslinked exterior, as claimed in claim 28, characterized in that the polyisocyanate has been hydrophilically modified.

32. The polymer microparticle dispersed in an aqueous phase and with a fully crosslinked exterior, as claimed in claim 1, characterized in that the degree of neutralization of the polyesterpolyol throughout the preparation process is between 30 and 100%, in particular between 50 and 80%.

33. The polymer microparticle dispersed in an aqueous phase and with a fully crosslinked exterior, as claimed in claim 1, characterized in that the polymerization corresponding to step a) is conducted as an emulsion polymerization using a nozzle jet disperser or a water jet emulsifier.

34. The polymer microparticle dispersed in an aqueous phase and with a fully crosslinked exterior, as claimed in claim 1, characterized in that the polymerization corresponding to step a) is conducted as a redox polymerization using ascorbic acid, iron(II) sulfate, and at least one hydroperoxide.

35. The polymer microparticle dispersed in an aqueous phase and with a fully crosslinked exterior, as claimed in claim 1, characterized in that it is converted into a water-free form.

36. A method of preparing an aqueous or solventborne coating composition, comprising adding a polymer microparticle of claim 1 to an aqueous or organic solution.

37. The method of claim 36, wherein the aqueous or solventborne coating composition is a basecoat material or a clearcoat material for use in the automobile industry.

38. The method of claim 36, wherein the aqueous or solventborne coating composition is a pigment formulation.

* * * * *